(12) United States Patent
Kim et al.

(10) Patent No.: US 8,532,083 B2
(45) Date of Patent: Sep. 10, 2013

(54) METHOD FOR ALLOCATING DYNAMIC TRANSMIT TIME INTERVAL

(75) Inventors: Jeong Ki Kim, Anyang-si (KR); Ki Seon Ryu, Seongnam-si (KR); Young Soo Yuk, Seoul (KR)

(73) Assignee: LG Electronics Inc., Seoul (KR)

( * ) Notice: Subject to any disclaimer, the term of this patent is extended or adjusted under 35 U.S.C. 154(b) by 515 days.

(21) Appl. No.: 12/866,681

(22) PCT Filed: Feb. 20, 2009

(86) PCT No.: PCT/KR2009/000818
§ 371 (c)(1),
(2), (4) Date: Aug. 6, 2010

(87) PCT Pub. No.: WO2009/104922
PCT Pub. Date: Aug. 27, 2009

(65) Prior Publication Data
US 2010/0322229 A1     Dec. 23, 2010

Related U.S. Application Data

(60) Provisional application No. 61/030,570, filed on Feb. 22, 2008.

(30) Foreign Application Priority Data

Apr. 3, 2008  (KR) .................... 10-2008-0031215
Dec. 17, 2008 (KR) .................... 10-2008-0128831

(51) Int. Cl.
*H04J 3/00*     (2006.01)

(52) U.S. Cl.
USPC .................. 370/345; 370/342; 370/343

(58) Field of Classification Search
USPC .................................... 370/345–350
See application file for complete search history.

(56) References Cited

U.S. PATENT DOCUMENTS

| | | | |
|---|---|---|---|
| 8,000,272 B2* | 8/2011 | Gao et al. ............... | 370/280 |
| 2007/0086418 A1* | 4/2007 | Jang et al. ............... | 370/347 |
| 2007/0201404 A1* | 8/2007 | Cheon et al. ............ | 370/331 |
| 2010/0197337 A1* | 8/2010 | Larsson et al. .......... | 455/522 |

FOREIGN PATENT DOCUMENTS

| | | |
|---|---|---|
| EP | 1355442 | 10/2003 |
| EP | 1816807 | 8/2007 |
| WO | 2007-046618 | 4/2007 |

* cited by examiner

*Primary Examiner* — Luat Phung
(74) *Attorney, Agent, or Firm* — Lee, Hong, Degerman, Kang & Waimey

(57) ABSTRACT

A method for allocating various transmit time intervals (TTIs) if a sub-frame structure is used, in a radio access system is provided. A transmitter transmits a super frame header including TTI information of a sub-frame included in a super frame to a receiver and transmits a sub-map including resource allocation information to the receiver, thereby dynamically allocating the TTI. Since the TTI information may not be received via the sub-map in every sub-frame, it is possible to prevent waste of a radio resource.

9 Claims, 22 Drawing Sheets

METHOD FOR ALLOCATING DYNAMIC TRANSMIT TIME INTERVAL

CROSS-REFERENCE TO RELATED APPLICATIONS

This application is the National Stage filing under 35 U.S.C. 371 of International Application No. PCT/KR2009/000818, filed on Feb. 20, 2009, which claims the benefit of U.S. Provisional Application No. 61/030,570, filed on Feb. 22, 2008, and also claims the benefit of earlier filing date and right of priority to Korean Patent Application No. 10-2008-0031215, filed on Apr. 3, 2008, and Korean Patent Application No. 10-2008-0128831 filed on Dec. 17, 2008, the contents of which are all hereby incorporated by reference herein in their entirety.

TECHNICAL FIELD

The present invention relates to a method for allocating various transmit time intervals if a sub-frame structure is used, in a radio access system.

BACKGROUND ART

Hereinafter, a general frame structure used in a radio access system will be described.

FIG. 1 is a view showing a frame structure used in a wideband radio access system (e.g., the IEEE 802.16 system).

Referring to FIG. 1, a horizontal axis of a frame indicates an orthogonal frequency division multiplexing access (OFDMA) symbol as a time unit, and a vertical axis of the frame indicates a logical number of a sub-channel as a frequency unit. In FIG. 1, one frame is divided into data sequence channels during a predetermined time period by physical characteristics. That is, one frame includes one downlink (DL) sub-frame and one uplink (UL) sub-frame. The downlink sub-frame and the uplink sub-frame are distinguished from each other by a transmit transition gap (TTG), and frames are distinguished from each other by a receive transition gap (RTG).

At this time, the DL sub-frame may include one preamble, a frame control header (FCH), a DL-MAP, a UL-MAP, and one or more data bursts. In addition, the UL sub-frame may include one or more UL data bursts and a ranging sub-channel.

In FIG. 1, the preamble is specific sequence data located at a first symbol of every frame and is used to perform synchronization of a mobile station with a base station or estimation of a channel. The FCH is used to provide channel allocation information and channel code information associated with the DL-MAP. The DL-MAP/UL-MAP is a media access control (MAC) message used for informing a mobile station of channel resource allocation in downlink/uplink. In addition, the data burst indicates the unit of data which is transmitted from a base station to a mobile station or from a mobile station to a base station.

A downlink channel descriptor (DCD) which may be used in FIG. 1 indicates an MAC message indicating the physical characteristics of a DL channel and an uplink channel descriptor (UCD) indicates an MAC message indicating the physical characteristics of a UL channel.

In downlink, referring to FIG. 1, the mobile station detects the preamble transmitted from the base station and performs the synchronization with the base station. Thereafter, the DL-MAP may be decoded using information acquired from the FCH. The base station may transmit scheduling information for DL or UL resource allocation to the mobile station in each frame (e.g., 5 ms) using the DL-MAP or UL-MAP message.

Since the DL-MAP/UL-MAP message shown in FIG. 1 is transmitted with a modulation coding scheme (MCS) level which can be received by every mobile station, unnecessary map message overhead may occur. For example, since mobile stations located in the vicinity of the base station have good channel statuses, a high MCS level (e.g., QPSK 1/2) may be used for encoding or decoding the message. However, the base station encodes the map message with a low MCS level (e.g., QPSK 1/12) and transmits the map message, for mobile stations which are located at the edges of its cell, without considering the channel status. Accordingly, since each mobile station always receives the message encoded with the same MCS level regardless of the channel status, unnecessary map message overhead may occur.

FIG. 2 is a view showing an example of hybrid automatic repeat request (HARQ) control signal delay at the time of transmission of DL data used generally.

Referring to FIG. 2, in any frame (e.g., an $N^{th}$ frame) of a wideband radio access system (e.g., WiMAX), a base station may transmit a DL-MAP to a mobile station and inform the mobile station of DL burst information of a current frame. The mobile station may receive a DL data burst from the base station in an $N^{th}$ frame (S0101).

In addition, the base station may transmit a UL-MAP to the mobile station in the $N^{th}$ frame and inform the mobile station of UL channel information for transmitting a control signal (e.g., an acknowledgement (ACK) signal). Accordingly, generally, if the HARQ is applied, the mobile station may transmit an ACK/NACK signal of a DL data burst to the base station in an $N+1^{th}$ frame (S0102).

In FIG. 2, HARQ ACK delay may be generated by at least one frame. In addition, if the NACK signal is generated, retransmission delay may be increased by the processing delay of the base station. That is, the frame structure (e.g., the IEEE 802.16e system) used generally has fixed ACK delay with respect to the DL burst.

In a general radio access system, as described with reference to FIG. 2, the processing delay, the transmission delay or the like may occur. Accordingly, in order to prevent the transmission delay or the processing delay, there is a need for developing a new wideband radio access system. At this time, the new wideband radio access system uses the frame structure of a general radio access system and a new frame structure.

In the general radio access system, a transmit time interval (TTI) is set in the unit of frames. Accordingly, if the concept of the existing TTI is applied to the new radio access system without change, the base station should transmit scheduling information for downlink traffic to the mobile station via a sub-map in every sub-frame. In this case, a probability that a radio resource may be wasted is high.

DISCLOSURE

Technical Problem

An object of the present invention devised to solve the problem lies on a method for allocating a dynamic transmit time interval (TTI) using a super map.

Another object of the present invention devised to solve the problem lies on a method for controlling a dynamic TTI using a sub-map.

Another object of the present invention devised to solve the problem lies on a method for allocating changed TTI information using a sub-map if basic TTI information allocated via a super map is desired to be changed.

Technical Solution

The present invention suggested in order to solve the above-described technical problem relates to a communication method using a new frame structure and map structure in a radio access system.

The object of the present invention can be achieved by providing a method for allocating a dynamic transmit time interval (TTI) in a radio access system, the method including transmitting a super frame header (SFH) including TTI information of a sub-frame included in a super frame to a receiver; and transmitting a sub-map (A-map) including resource allocation information to the receiver. At this time, the TTI information may include information indicating how many sub-frames configure one TTI. Also, TTI information further includes location information of the sub-map that describes which subframe includes the sub-map. A TTI for transmitting the super frame header may be configured as one subframe. Also, the sub-maps (A-MAPs) are located in a first subframe of the TTI when one TTI is configured as one or more sub-frames.

The method may further include transmitting a sub-map including changed TTI information to the receiver.

The method may further include transmitting a SFH including changed TTI information to the receiver.

The super map may further include sub-frame configuration information, and the sub-frame configuration information may include information indicating a number of sub-frames included in the super frame and information (DL/UL ratio) indicating how many downlink sub-frames and uplink sub-frames configure the super frame.

The super frame may include four frames, and each of the frames may include five downlink sub-frames and three uplink sub-frames.

In another aspect of the present invention, provided herein is a method for allocating a dynamic transmit time interval (TTI) in a radio access system, the method including: transmitting a super frame header (SFH) including sub-frame configuration information included in a super frame to a receiver; and transmitting a sub-map including TTI information and resource allocation information to the receiver.

The method may further include transmitting a sub-map including changed TTI information to the receiver.

In another aspect of the present invention, provided herein is a method for allocating a dynamic transmit time interval (TTI) in a radio access system, the method including: receiving a super frame header (SFH) including sub-frame configuration information and TTI information included in a super frame; receiving a sub-map including resource allocation information; and transmitting an uplink control signal according to the TTI information.

The method may further include receiving a sub-map including changed TTI information.

In another aspect of the present invention, provided herein is a method for allocating a dynamic transmit time interval (TTI) in a radio access system, the method including: receiving a super frame header (SFH) including sub-frame configuration information included in a super frame; receiving a sub-map including TTI information and resource allocation information.

In another aspect of the present invention, provided herein is a method for allocating a dynamic transmit time interval (TTI) in a radio access system, the method including periodically transmitting a system information delivering message including TTI information to a receiver.

The method may further include transmitting a sub-map including changed TTI information to the receiver.

The method may further include transmitting a super frame header (SFH) including changed TTI information to the receiver.

Advantageous Effects

The present invention has the following effects.

First, according to the present invention, since TTI information may not be received via a sub-map in every sub-frame, it is possible to prevent waste of a radio resource.

Second, it is possible to perform an efficient communication procedure regardless of a sub-frame configuration unit, by providing a method for variously controlling a TTI even in a radio access system which is newly introduced.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
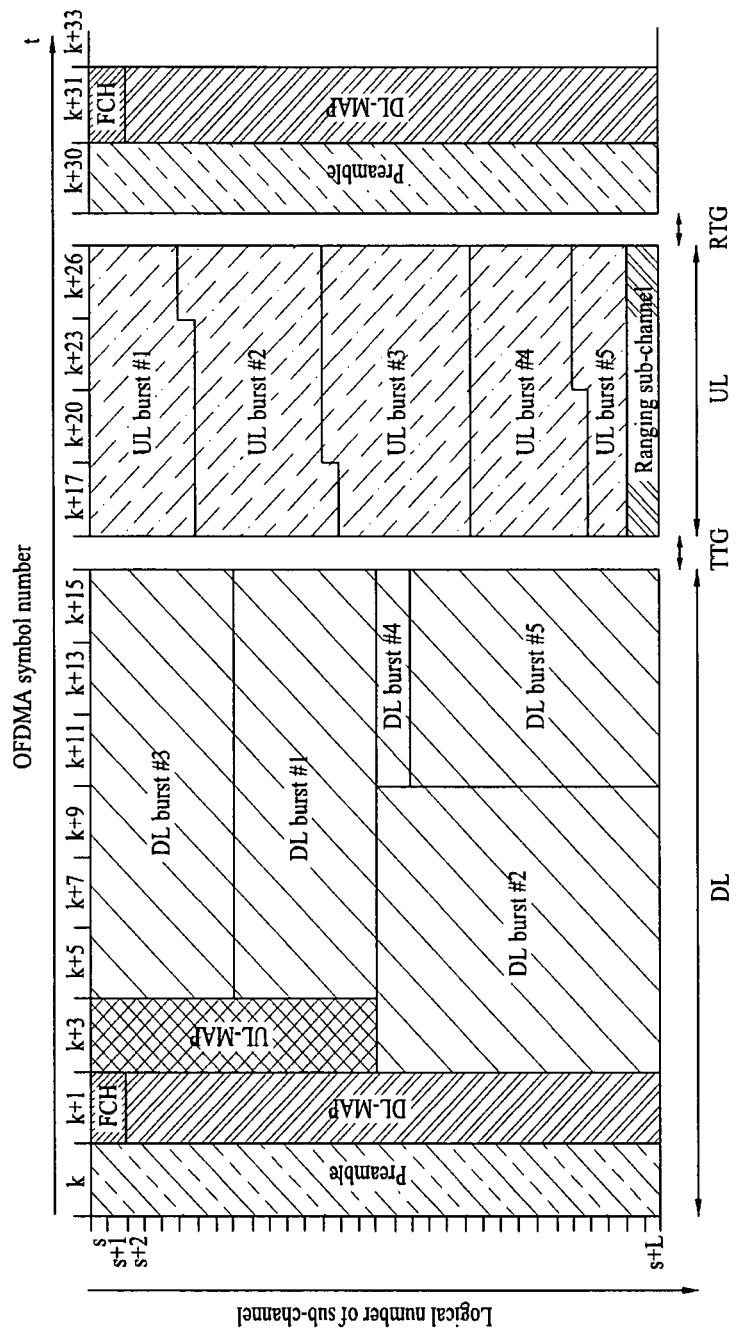
FIG. 1 is a view showing a frame structure used in a wideband radio access system (e.g., IEEE 802.16).
Figure 2:
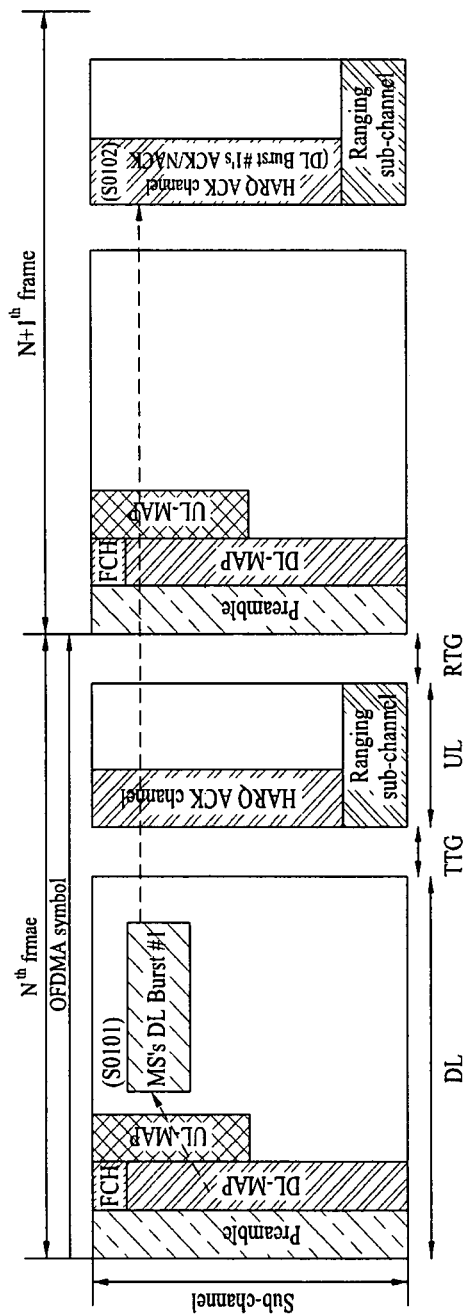
FIG. 2 is a view showing an example of hybrid automatic repeat request (HARQ) control signal delay at the time of transmission of downlink (DL) data used generally.

In order to solve the problems, the present invention relates to a method for allocating various transmit time intervals (TTIs) when a sub-frame structure is used, in a radio access system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station" may also be replaced with a user equipment (UE), a mobile station (MS) or a mobile subscriber station (MSS) as necessary.

The following embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The specific terms used in the following description are provided for facilitating the understanding of the present invention and may be changed without departing from the technical spirit of the present invention.

Hereinafter, the exemplary embodiments of the present invention will be described with reference to the accompanying drawings.

Figure 3:
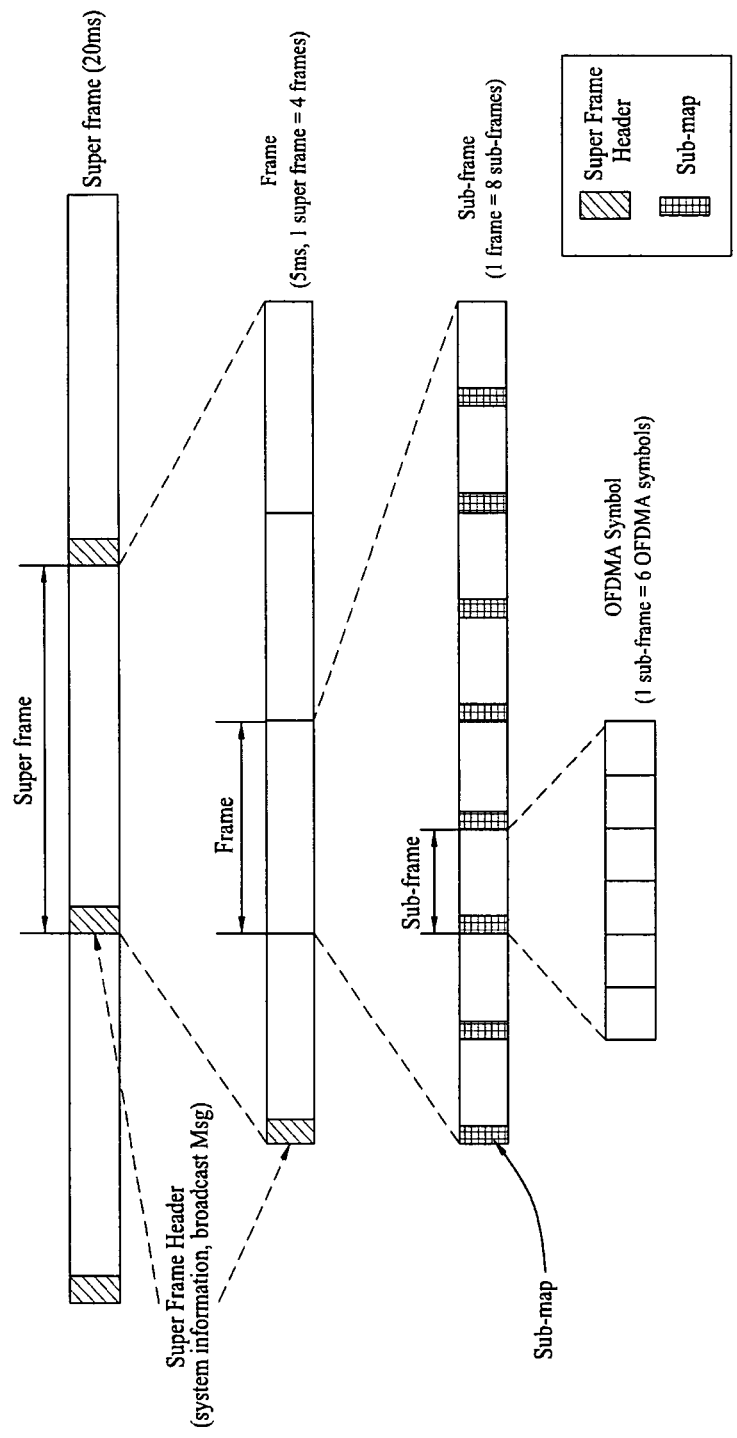
FIG. 3 is a view showing a new frame structure used in the embodiments of the present invention.

FIG. 3 is a view showing a new frame structure used in the embodiments of the present invention.

Referring to FIG. 3, one super frame may include one or more frames, and one frame may include one or more sub-frames. In addition, one sub-frame may include one or more OFDMA symbols.

The lengths and the numbers of super frames, frames, sub-frames and symbols may be adjusted by the requirement of a user, a system environment or the like. In the embodiments of the present invention, the term "sub-frame" is used. At this time, the "sub-frame" indicates a low-level frame structure generated by dividing one frame by a predetermined length.

In FIG. 3, it is assumed that the length of one super frame is 20 ms and the length of the frame is 5 ms. That is, one super frame may include four frames. In addition, one frame may have a frame structure including eight sub-frames. At this time, one sub-frame may include six OFDMA symbols. These values may be changed according to channel environments.

In FIG. 3, a super frame map including physical (or logical) channel information (or system information) of a system, such as frame configuration information, is located at the front portion of each super frame. The super frame map may be called a super map, a broadcast control channel (BCH), a common control channel (CCH), a system information message, a system information channel, or a super frame header (SFH). In the embodiments of the present invention, the super frame map may be called the super frame header. In addition, a sub-frame map including resource allocation information of one mobile station or one mobile station group may be located at the front portion of the sub-frame. The sub-frame map may be called a map, a physical downlink control channel (PDCCH), a user specific control channel (USCCH), user specific control information (USCI) or a sub-map. Also, the sub-frame map may be called A-MAP (advanced MAP).

In the embodiments of the present invention, for convenience, the sub-frame map is called the sub-map. The sub-map includes a downlink sub-map (DL-Sub MAP) and an uplink sub-map (UL-Sub MAP).

Figure 4:
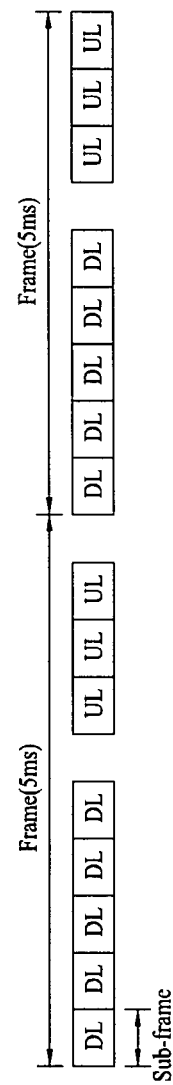
FIG. 4 is a view showing the configuration of a downlink (DL) sub-frame and an uplink (UL) sub-frame in a time division duplexing (TDD) system used in the embodiments of the present invention.

FIG. 4 is a view showing the configuration of a DL sub-frame and a UL sub-frame in a time division duplexing (TDD) system used in the embodiments of the present invention.

FIG. 4 shows the sub-frame structure in which the number of DL sub-frames and the number of UL sub-frames are different from each other. Referring to FIG. 4, the ratio of DL sub-frames to UL sub-frames is 5:3. That is, if one frame includes eight sub-frames, one frame may include five DL sub-frames and three UP sub-frames.

Figure 5:
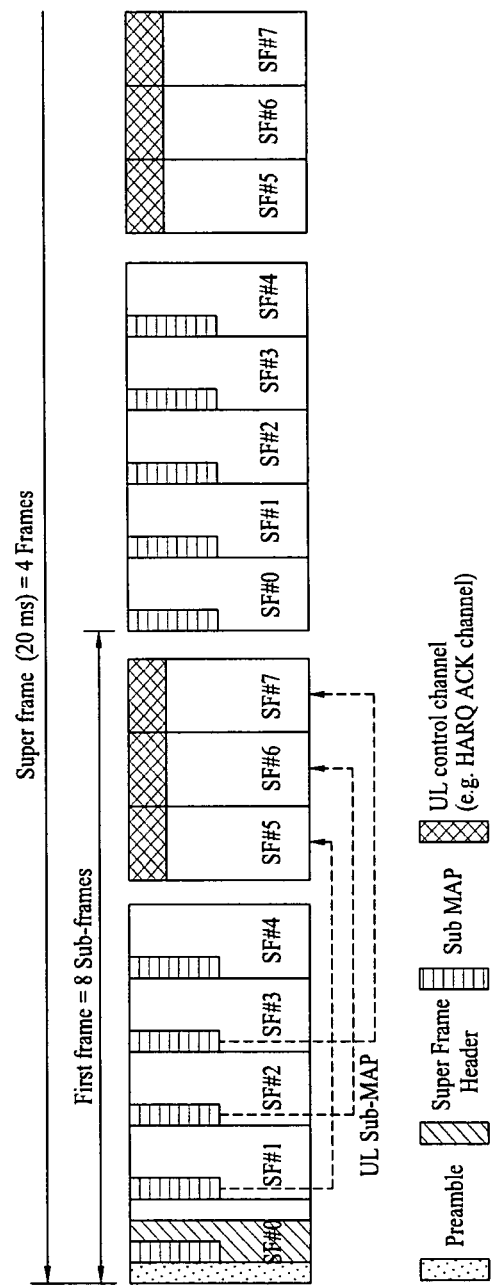
FIG. 5 is a view showing an example of a sub-frame structure including DL and UL control channels used in the embodiments of the present invention.

FIG. 5 is a view showing an example of a sub-frame structure including DL and UL control channels used in the embodiments of the present invention.

FIG. 5 shows a case where the configuration ratio (DL/UL ratio) of the DL sub-frames to the UL sub-frames is 5:3 as shown in FIG. 4. Referring to FIG. 5, a preamble is located at a foremost portion of a super frame, and a sub-map is located at each DL sub-frame. The DL sub-map may be located at the back of the preamble in a first DL sub-frame (SF #0). The sub-map may be located at each of the foremost portions of the residual DL sub-frames (SF #1 to #4). In addition, a UL control channel may be included in each of the upper portions of the UL sub-frames on a frequency axis.

In FIG. 5, the sub-map includes both a DL sub-map and a UL sub-map. Accordingly, the sub-map may become at least one of the DL sub-map and the UL sub-map according to functions.

The DL sub-map mainly includes resource allocation information of the DL sub-frame. The UL sub-map may be located at the back of the DL sub-map. In FIG. 5, the UL sub-map may be located at the back of the DL sub-map in each of second, third and fourth sub-frames (That is, SF #1, SF #2 and SF #3).

In FIG. 5, the UL sub-maps of SF #1, SF #2 and SF #3 may include resource allocation information corresponding to SF #5, SF #6 and SF #7, respectively. The UL sub-frames SF #5, SF #6 and SF #7 may include the UL control channels associated with the UL sub-frames, such as a HARQ ACK/NACK channel, a fast feedback channel, a ranging channel and so on.

Figure 6:
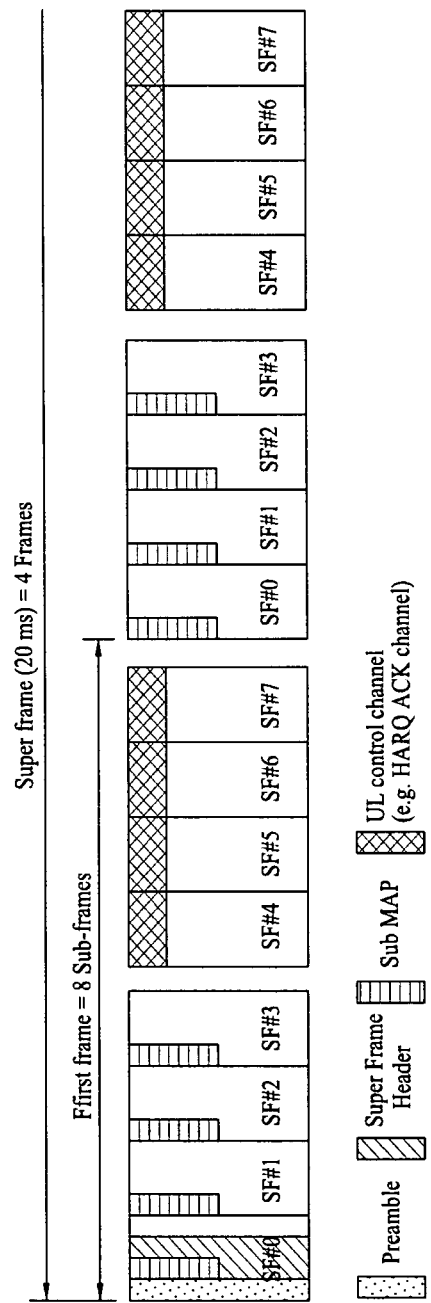
FIG. 6 is a view showing another example of a sub-frame structure including DL and UL control channels used in the embodiments of the present invention.

FIG. 6 is a view showing another example of a sub-frame structure including DL and UL control channels used in the embodiments of the present invention.

FIG. 6 shows a case where a ratio (DL/UL ratio) of the DL sub-frames to the UL sub-frames included in the super frame is 4:4. That is, the number of DL sub-frames is 4 and the number of UL sub-frames is 4. For the other sub-frame configuration information, refer to FIG. 5.

Figure 7:
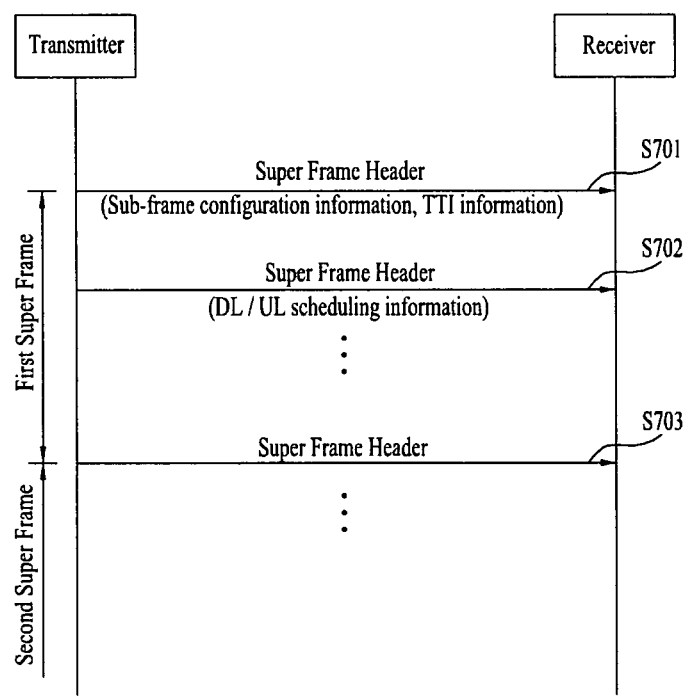
FIG. 7 is a view showing a method for allocating a transmit time interval (TTI) using a super map, according to an embodiment of the present invention.

FIG. 7 is a view showing a method for allocating a TTI using a super frame header, according to an embodiment of the present invention.

Referring to FIG. 7, a transmitter transmits a super frame header including sub-frame configuration information and TTI information of a first super frame to a receiver (S701).

In the step S701, the sub-frame configuration information may include information about the number of sub-frames included in the super frame and information about the configuration ratio (DL/UL ratio) of the DL sub-frames to the UL sub-frames. In addition, the TTI information indicates information about how many sub-frames configure one TTI. Furthermore, TTI information further includes the location information of the sub-map that describes which subframe include the sub-map. That is, the TTI may be set in the unit of sub-frames using the TTI information, and one sub-map (a channel for transmitting resource allocation information) may generally exist per TTI.

Table 1 shows an example of the TTI information included in the super frame header.

TABLE 1

| Name | Size | Value |
|---|---|---|
| Basic DL TTI | 2 bits | This indicates TTI supported by the system and the unit thereof indicates the number of sub-frames. 0b00: The TTI unit includes one sub-frame 0b01: The TTI unit includes two sub-frames. 0b10: The TTI unit includes three sub-frames. 0b11: The TTI unit includes four sub-frames. Default value = 0b00 |
| Basic UL TTI | 2 bits | This indicates TTI supported by the system and the unit thereof indicates the number of sub-frames. 0b00: The TTI unit includes one sub-frame 0b01: The TTI unit includes two sub-frames. 0b10: The TTI unit includes three sub-frames. 0b11: The TTI unit includes four sub-frames. Default value = 0b00 |

Referring to Table 1, the basic DL TTI information has 2 bits and indicates TTI configuration information of a DL sub-frame. For example, the TTI information of "0b00" indicates that one TTI includes one sub-frame, "0b01" indicates that one TTI includes two sub-frames, "0b10" indicates that one TTI includes three sub-frames, and "0b11" indicates one TTI includes four sub-frames.

The basic UL TTI information indicates TTI configuration information of a UL sub-frame included in a super frame. The 2-bit configuration of the basic UL TTI information is equal to that of the basic DL TTI information in the representation thereof.

Referring to FIG. 7 again, the transmitter may transmit a sub-map including DL or UL scheduling information to the receiver (S702).

In the step S702, the DL scheduling information may include allocation information of DL data bursts. In addition, the UL scheduling information may include UL data burst allocation information and UL control channel configuration information. That is, the scheduling information indicates radio resource allocation information.

After the transmission time of a first super frame is elapsed, the transmitter transmits a super frame header to the receiver in order to transmit a second super frame. At this time, the super header may include sub-frame configuration information of the second super frame and TTI information of the second super frame (S703).

The TTI information may be transmitted to the receiver using the super frame header by the method described with reference to FIG. 7. That is, a variety of TTI configuration information is transmitted to the receiver using the super frame header, thereby dynamically allocating the TTI.

Figure 8:
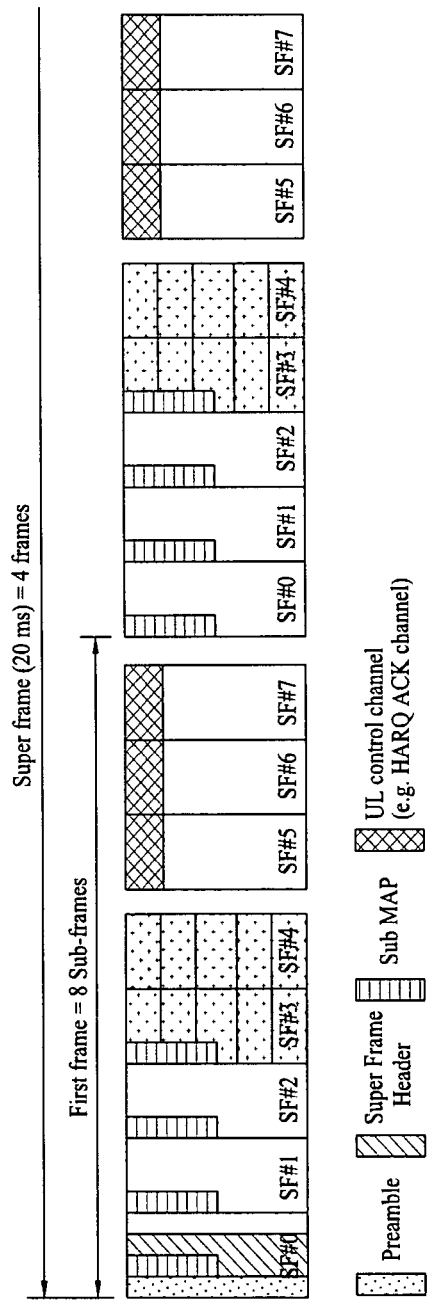
FIG. 8 is a view showing an example of a sub-frame structure in which a TTI is allocated, according to an embodiment of the present invention.

FIG. 8 is a view showing an example of a sub-frame structure in which a TTI is allocated, according to an embodiment of the present invention.

In FIG. 8, the TTI of each of first, second and third sub-frames (that is, SF #0, SF #1 and SF #2) includes one sub-frame. In addition, fourth and fifth sub-frames (that is, SF #3 and SF #4) may configure one TTI. That is, the DL scheduling information of each of SF #0, SF #1 and SF #2 may be included in the DL sub-map of each DL sub-frame. In addition, the scheduling information of SF #3 and SF #4 is included in the sub-map of SF #3. In this case, a base station (BS) should deliver information about the TTI of the DL sub-frame to a mobile station (MS).

Accordingly, the BS may include the TTI information in the super frame header and transmit the super frame header to the MS, in order to dynamically control the TTI within the super frame. That is, the BS may include the basic TTI information of Table 1 in the super frame header and dynamically configure the TTI. The MS may acquire a basic transmission unit from the super frame using the TTI information included in the super frame header.

In addition, the BS may include allocation information of the UL control channels of the UL sub-frames in the UL sub-maps and transmit the UL sub-maps to the MS. The MS may acquire allocation information of the UL control channels via the sub-maps.

Figure 9:
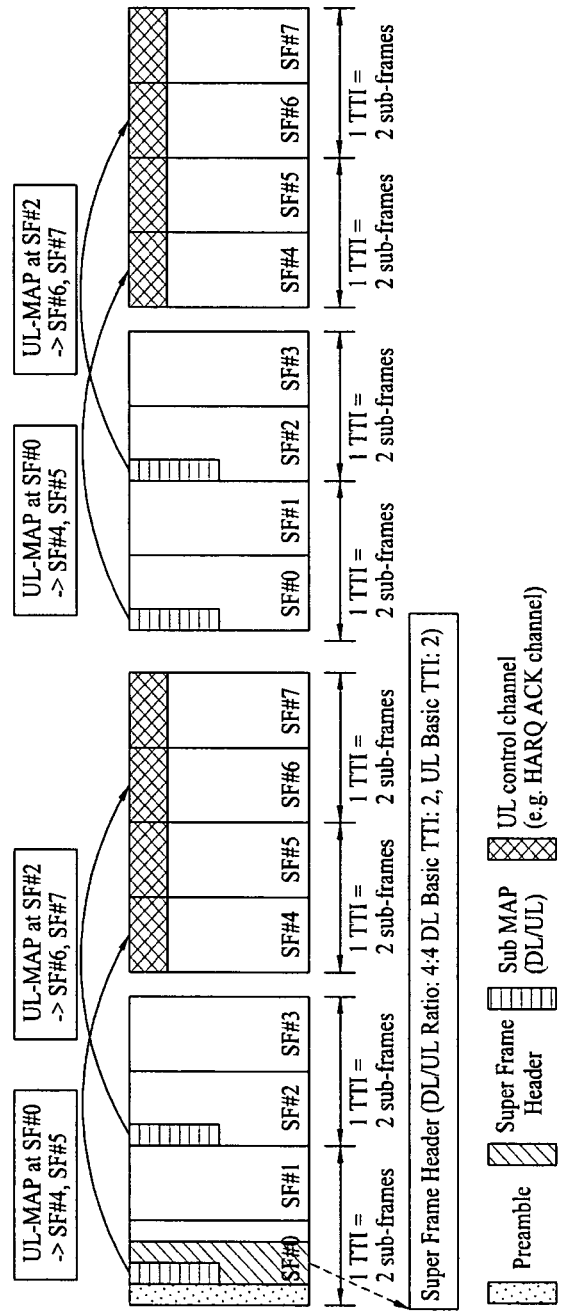
FIG. 9 is a view showing another example of a sub-frame structure in which a TTI is allocated, according to another embodiment of the present invention.

FIG. 9 is a view showing another example of a sub-frame structure in which a TTI is allocated, according to another embodiment of the present invention.

FIG. 9 shows a case where one frame includes eight sub-frames. In addition, FIG. 9 shows a case where a ratio of the UL sub-frames to the DL sub-frames is 4:4. At this time, the TTI of each of the DL sub-frames and the UL sub-frames in a first frame may include two sub-frames.

Referring to FIG. 9, in downlink, SF #0 and SF #1 configure one TTI and SF #2 and SF #3 configure one TTI. In addition, in uplink, SF #4 and SF #5 configure one TTI and SF #6 and SF #7 configure one TTI. At this time, the sub-map is located at the foremost side of a first sub-frame of each of the TTIs of the DL sub-frames. That is, in FIG. 9, the sub-map is located at SF #0 and SF #2.

UL scheduling information may be included in the sub-map of each TTI. Since the TTI includes two sub-frames in uplink, the sub-map of SF #0 includes the scheduling information of SF #4 and SF #5. In addition, the sub-map of SF #2 includes the scheduling information of SF #6 and SF #7.

DL scheduling information may be included in the sub-map of each TTI. The BS may inform the MS of the scheduling information corresponding to SF #0 and SF #1 using the sub-map included in SF #0. In addition, the BS may inform the MS of the scheduling information of SF #2 and SF #3 using the sub-map included in SF #2.

Figure 10:
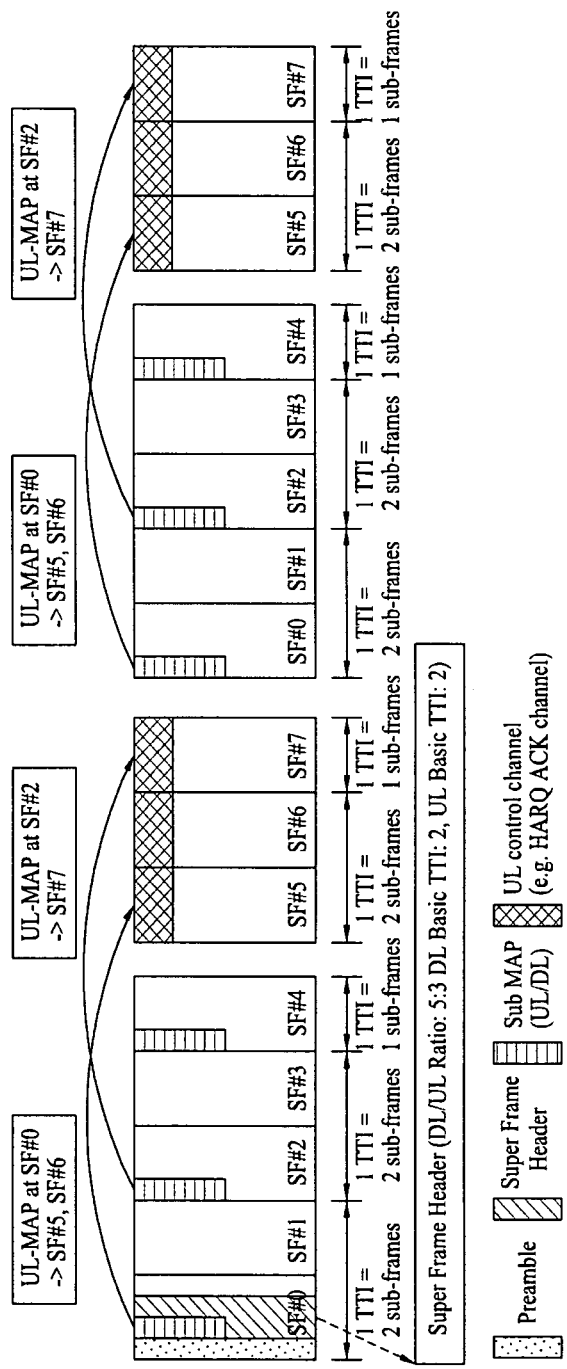
FIG. 10 is a view showing another example of a sub-frame structure in which a TTI is allocated, according to an embodiment of the present invention.

FIG. 10 is a view showing another example of a sub-frame structure in which a TTI is allocated, according to an embodiment of the present invention.

FIG. 10 shows a case where a ratio (DL/UL ratio) of the DL sub-frames to the UL sub-frames is 5:3 and the basic TTI information is set to "0b01". That is, two sub-frames configure one TTI. In FIG. 10, if the basic TTI is configured according to the TTI information included in the super frame header and the residual frame does not configure the basic TTI, the residual sub-frame may automatically configure one TTI.

Referring to FIG. 10, since the DL/UL ratio is 5:3, the TTI configuration of the DL sub-frames is as follows. SF #0 and SF #1 configure one TTI and SF #2 and SF #3 configure one TTI. At this time, since SF #4 is a last DL sub-frame, one TTI cannot be configured by two sub-frames. Accordingly, SF #4 configures one TTI as a sub-frame. In FIG. 10, even in the UL sub-frame, SF #5 and SF #6 may configure one TTI and SF #7 may configure one TTI.

In FIG. 10, the sub-map of SF #0 may include scheduling information of SF #5 and SF #6 which are UL sub-frames, and the sub-map of SF #2 may include scheduling information of SF #7.

Referring to FIGS. 9 and 10, the super frame header and the sub-map of the first sub-frame are located at the back of a preamble. In some cases, the sub-map may be located at the back of the super frame header (or a portion of the first sub-frame). However, in this case, the residual operation is identical except the locations of the super frame header and the sub-map.

Figure 11:
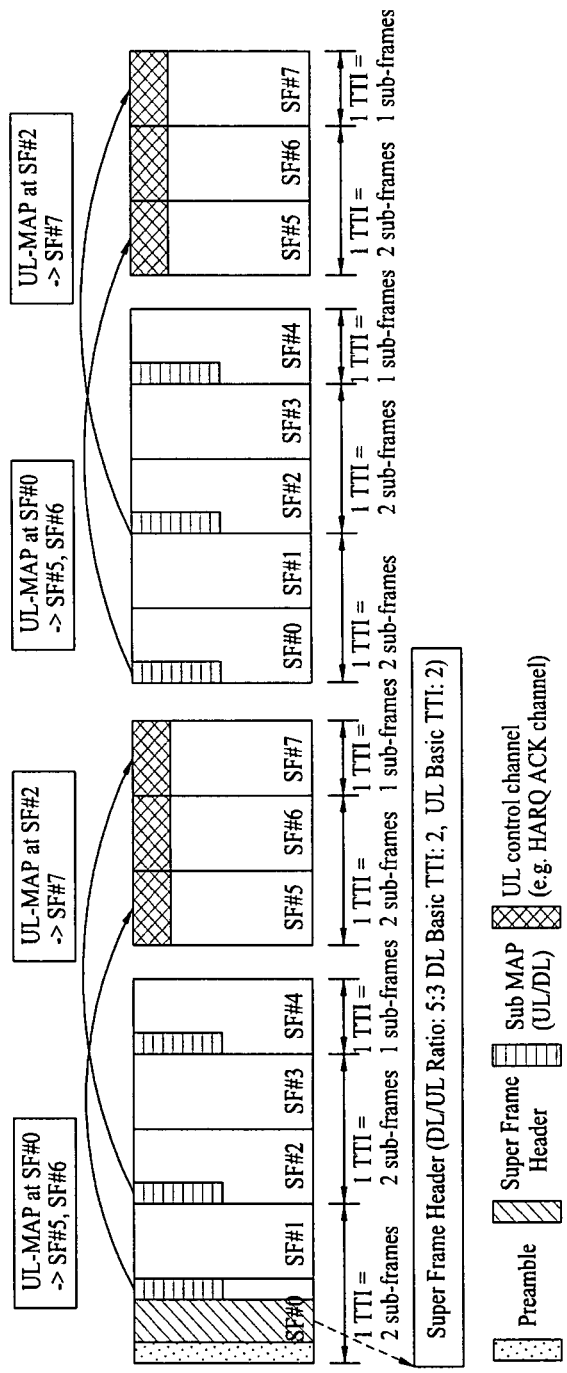
FIG. 11 is a view showing another example of a sub-frame structure in which a TTI is allocated, according to an embodiment of the present invention.

FIG. 11 is a view showing another example of a sub-frame structure in which a TTI is allocated, according to an embodiment of the present invention.

FIG. 11 shows the sub-frame structure similar to that of FIG. 10. FIG. 11 is different from FIG. 10 in the locations of the super frame header and the sub-map in the first sub-frame. That is, FIG. 11 shows a case where the sub-map of the first sub-frame is located at the back of the super frame header.

FIGS. 8 to 11 show the cases where the super frame header and the sub-map are included in the first sub-frame. If the super frame header is located in the first sub-frame and residual symbols are used to transmit system information or frame (or sub-frame) configuration information, the first sub-frame may not include the sub-map. That is, the restricted resource may be efficiently used.

Figure 12:
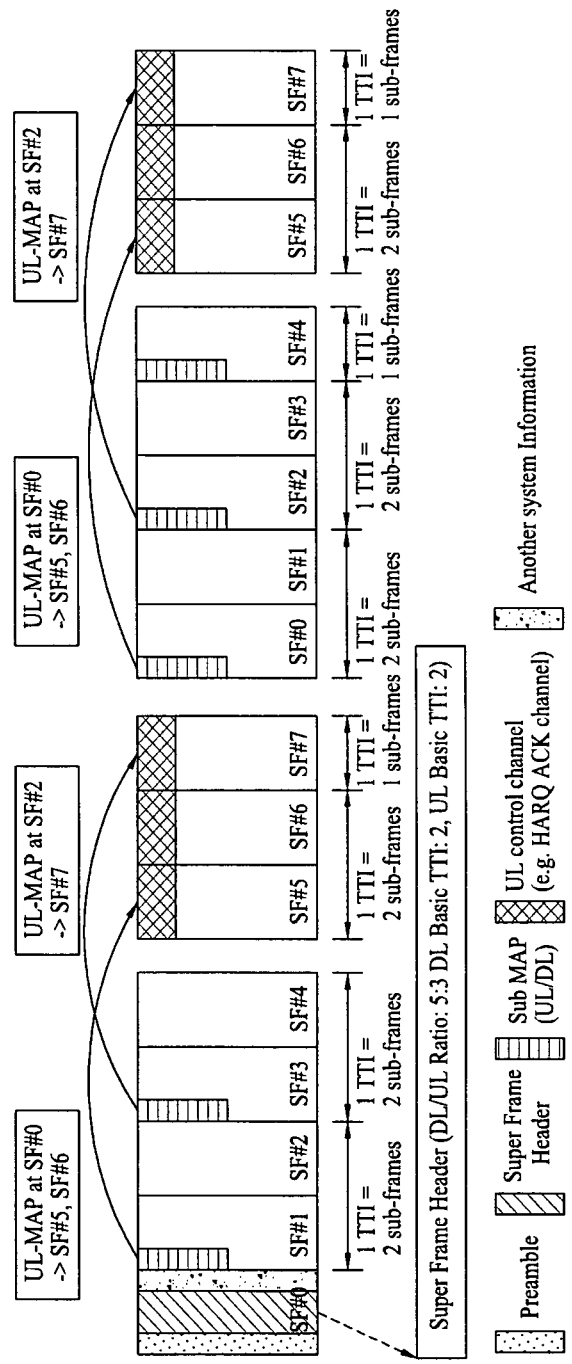
FIG. 12 is a view showing another example of a sub-frame structure in which a TTI is allocated, according to an embodiment of the present invention.

FIG. 12 is a view showing another example of a sub-frame structure in which a TTI is allocated, according to an embodiment of the present invention.

FIG. 12 shows a case where a first sub-frame of a super frame does not include a sub-map. That is, if the sub-map is not included in the first sub-frame included in the super frame, a TTI is computed from a second sub-frame of the super frame.

The first frame of the super frame will be described with reference to FIG. 12. In the DL sub-frames of the first frame, SF #1 and SF #2 configure one TTI and SF #3 and SF #4 configure one TTI. In addition, in the UL sub-frames, SF #5 and SF #6 configure one TTI and SF #7 configures one TTI.

UL TTI information of the first frame is transmitted to an MS via a super frame header. In addition, scheduling information of SF #5 and SF #6 which are UL sub-frames is included in the sub-map (that is, UL Sub-MAP) of SF #1 and scheduling information of SF #7 is included in the sub-map (that is, UL Sub-MAP) of SF #3.

The TTI configuration from the second frame to the last frame of the super frame is as follows, according to the super frame header. In the DL sub-frames, SF #0 and SF #1 configure one TTI, SF #2 and SF #3 configure one TTI, and SF #4 configures one TTI. In the UL sub-frame, SF #5 and SF #6 configure one TTI and SF #7 configures one TTI. In the super frames, scheduling information of SF #5 and SF #6 of the second frame may be included in the sub-map of SF #0 and scheduling information of SF #7 may be included in the sub-map of SF #2.

Figure 13:
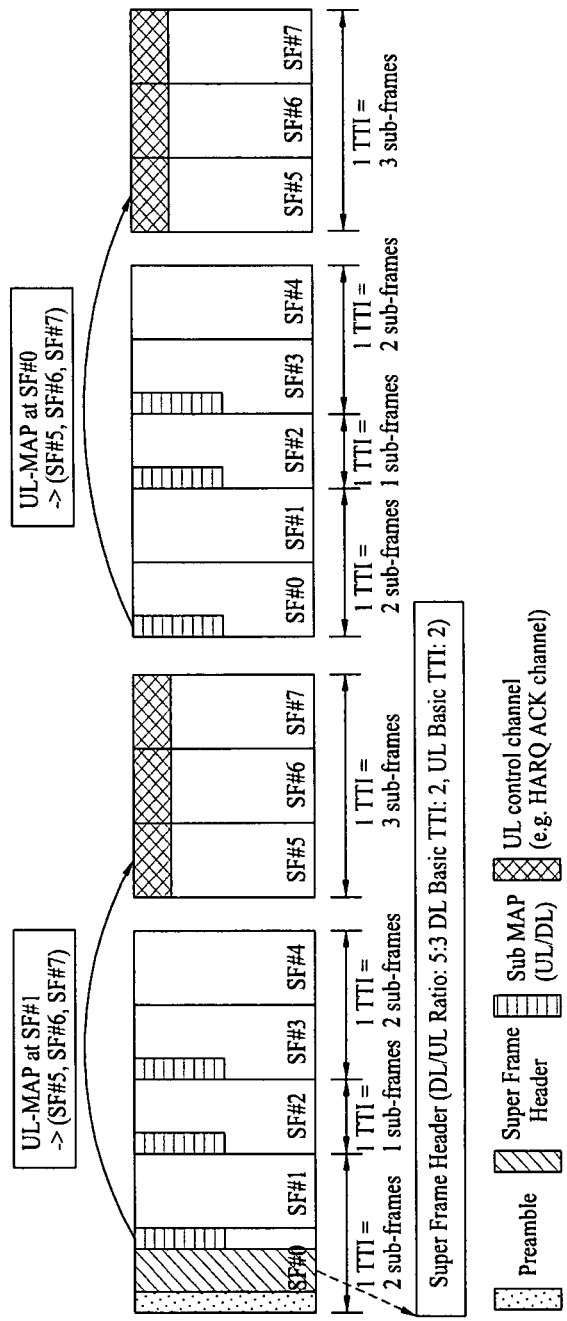
FIG. 13 is a view showing another example of a sub-frame structure in which a TTI is allocated, according to an embodiment of the present invention.

FIG. 13 is a view showing another example of a sub-frame structure in which a TTI is allocated, according to an embodiment of the present invention.

A BS transmits a basic DL/UL TTI value set in the system to an MS using a super frame header. At this time, FIG. 13 shows a method for configuring the basic TTI information included in the super frame header by a bitmap having another format.

Table 2 shows an example of configuring the basic TTI information included in the super frame header by a bitmap having 8 bits.

TABLE 2

| Name | Size | Value |
| --- | --- | --- |
| Basic TTI | 8 bits | Each bit indicates TTI information of DL sub-frames and UL sub-frames. |

Referring to Table 2, the basic TTI information has a size of 8 bits. Each of the 8 bits may be mapped to each of eight sub-frames (that is, DL sub-frames and UL sub-frames). At this time, if the value of the bit is 1, it is indicated that a new TTI is started and, if the value of the bit is 0, it is indicated that a previous TTI is continued.

For example, when the ratio (DL/UL ratio) of the DL sub-frames to the UL sub-frames is 5:3, MSB (Most Significant Bit) 5 bits indicate information about the DL sub-frames. In addition, LSB (Least Significant Bit) 3 bits indicate information about the UL sub-frames. If the TTIs of all the sub-frames are set to 1, the bitmap of the basic TTI information is represented by "0b111111/111".

If the bitmap of the basic TTI information included in the super frame header is set to "0b11110/110", one sub-frame configures one TTI from the first DL sub-frame (SF #0) to third DL sub-frame (SF #2), and the fourth sub-frame (SF #3) and the fifth sub-frame (SF #4) configure one TTI (2 sub-frames). In addition, in the UL sub-frames, the first UL sub-frame (SF #5) configures one TTI, and two residual sub-frames (SF #6 and SF #7) configure one TTI.

FIG. 13 will be described with reference to Table 2.

Referring to FIG. 13, the ratio of the DL sub-frames to the UL sub-frames is 5:3 and the basic TTI information included in the super frame header is "0b10110/100". Referring to the basic TTI information, in the DL sub-frames, SF #0 and SF #1 configure one TTI, SF #2 configures one TTI, and SF #3 and SF #4 configure one TTI. In addition, in the UL sub-frames, SF #5, SF #6 and SF #7 configure one TTI. Accordingly, the MS can know how the TTI information of the frame unit of a current super frame is set, by checking the basic TTI information included in the super frame header. The sub-map may be located at SF #0, SF #1, and SF #3 which are start sub-frames of the TTIs by the TTI.

Figure 14:
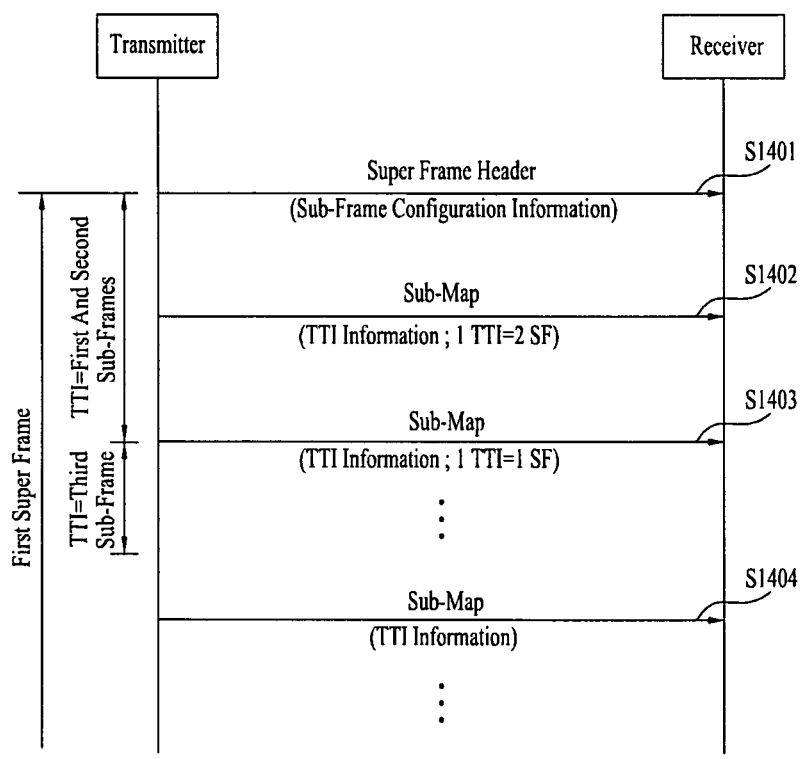
FIG. 14 is a view showing a method for allocating a TTI using a sub-map, according to another embodiment of the present invention.

FIG. 14 is a view showing a method for allocating a TTI using a sub-map, according to another embodiment of the present invention.

FIG. 14 shows a method for allocating a TTI to an MS by including basic TTI information in a sub-map and transmitting the sub-map. That is, a BS allocates the TTI using the sub-map so as to dynamically allocate the TTI to a sub-frame to be changed.

Referring to FIG. 14, a transmitter may transmit a super frame header including sub-frame configuration information (e.g., DL/UL ratio) in a first super frame to a receiver (S1401).

In the step S1401, the sub-frame configuration information may include information indicating how many sub-frames are included in the first super frame and information about a ratio of the DL sub-frames to the UL sub-frames between the sub-frames. In the embodiment of the present invention, it is assumed that the sub-frame structure described in FIGS. 3 and 4 is used.

The transmitter may include the basic TTI information in the sub-map and transmit the sub-map to the receiver. At this time, a first TTI includes a first sub-frame and a second sub-frame (S1402).

Table 3 shows an example of the basic TTI information which is fixedly included in the sub-map.

TABLE 3

| Name | Size | Value |
|---|---|---|
| DL TTI | 2 bits | This indicates the length of the DL TTI of the sub-frame unit and may be included in the DL sub-map.<br>0b00: The TTI unit includes one sub-frame<br>0b01: The TTI unit includes two sub-frames.<br>0b10: The TTI unit includes three sub-frames.<br>0b11: The TTI unit includes four sub-frames. |

TABLE 3-continued

| Name | Size | Value |
|---|---|---|
| UL TTI | 2 bits | This indicates the length of the UL TTI of the sub-frame unit and may be included in the UL sub-map.<br>0b00: The TTI unit includes one sub-frame<br>0b01: The TTI unit includes two sub-frames.<br>0b10: The TTI unit includes three sub-frames.<br>0b11: The TTI unit includes four sub-frames. |

Referring to Table 3, each of TTI information (DL TTI) of the DL sub-frames and TTI information (UL TTI) of UL sub-frames has 2 bits. For example, it is indicated that the TTI unit includes one sub-frame if the TTI is set to "0b00", it is indicated that the TTI unit includes two sub-frames if the TTI is set to "0b01", it is indicated that the TTI unit includes three sub-frames if the TTI is set to "0b10", and it is indicated that the TTI unit includes four sub-frames if the TTI is set to "0b11". Accordingly, the transmitter fixedly allocates 4 bits to the sub-map, in order to transmit the TTI information of the DL and UL sub-frames.

At this time, if the TTI included in the sub-map indicates "0b00", the corresponding sub-map may include scheduling information of a current sub-frame.

In addition, if the TTI included in the sub-map indicates "0b01", the corresponding sub-map may include scheduling information of the current sub-frame and a next sub-frame.

In addition, if the TTI included in the sub-map indicates "0b10", the corresponding sub-map may include scheduling information of three consecutive sub-frames from the current sub-frame. That is, since the scheduling information of the three consecutive sub-frames is represented by one sub-map, the transmitter may not transmit the sub-map in two subsequent consecutive sub-frames.

In addition, if the TTI included in the sub-map indicates "0b11", the corresponding sub-map may include scheduling information of four consecutive sub-frames from the current sub-frame. That is, since the scheduling information of the four consecutive sub-frames is represented by one sub-map, the transmitter may not transmit the sub-map in three subsequent consecutive sub-frames.

Referring to Table 3, in the step S1402 of FIG. 14, the TTI information included in the sub-map is "0b01". At this time, if the TTI configuration is desired to be changed in the third sub-frame (SF #2), the transmitter may include the changed TTI information in the sub-map and transmit the sub-map to the MS. For example, if only one sub-frame configures one TTI, the transmitter may set the TTI information to "0b00" and transmit the TTI information to the receiver (S1403).

The transmitter may transmit the sub-map including the TTI information so as to change the TTI configuration (S1404).

FIG. 14 shows a method for, at the transmitter, including the TTI information in the sub-map and transmitting the sub-map to the receiver. In this case, since the basic TTI information may not be included in the super frame header, it is possible to reduce the size of the super frame header. In order to include the TTI information in the sub-map, the sub-map requires a fixed TTI information field.

Figure 15:
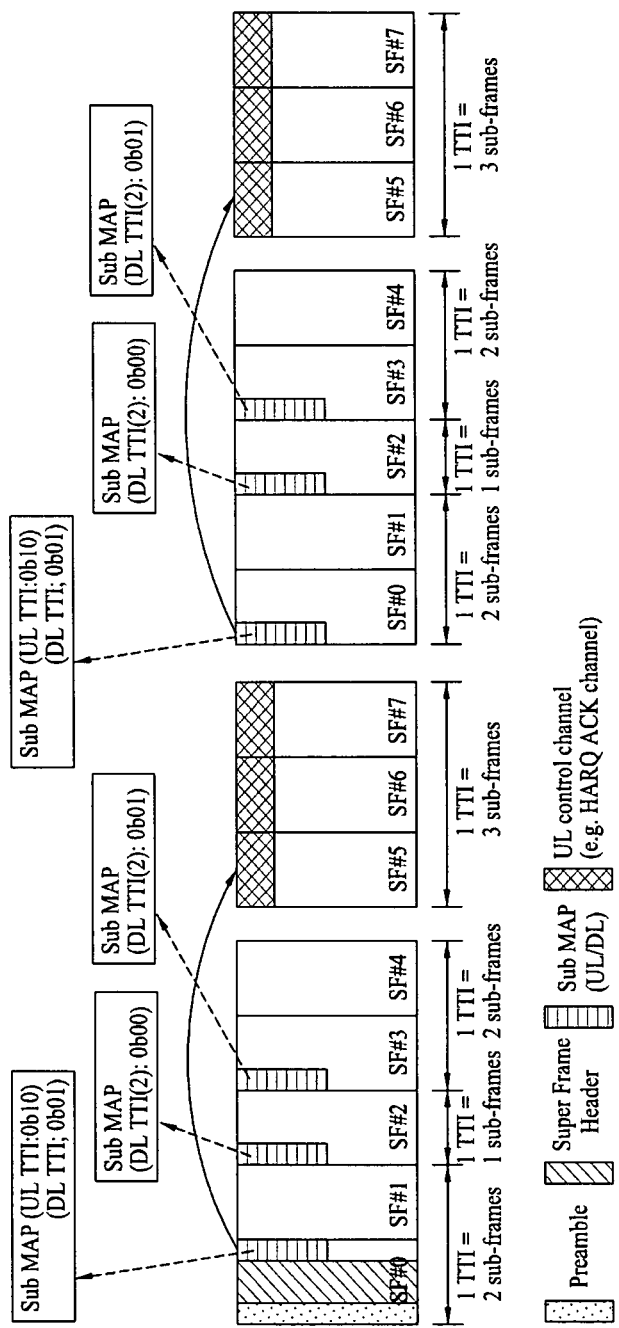
FIG. 15 is a view showing an example of a sub-frame structure in which a TTI is allocated, according to another embodiment of the present invention.

FIG. 15 is a view showing an example of a sub-frame structure in which a TTI is allocated, according to another embodiment of the present invention.

Referring to FIG. 15, the ratio (DL/UL ratio) of the DL sub-frames to the UL sub-frames included in one frame is 5:3. In addition, the DL TTI information is fixedly included in the sub-map, and the UL TTI information is included in the sub-map only when the UL allocation information needs to be included.

In FIG. 15, scheduling information of the UL sub-frames is included in only a sub-map of the first DL sub-frame (SF #0) of a first frame. That is, the UL TTI information is included only in the first sub-map. At this time, the UL TTI information is set to "0b10" (UL TTI=3 sub-frames). Accordingly, the UL scheduling information and the UL scheduling information are not included in the sub-maps of the residual DL sub-frames.

Since the TTI of each of the first DL sub-frame (SF #0) and the fourth DL sub-frame (SF #3) includes two sub-frames, the TTI information of the sub-map is set to "0b01". In addition, if the TTI of the third DL sub-frame (SF #2) includes one sub-frame, the TTI information of the sub-map is set to "0b00".

In FIG. 15, only the super frame header is not included in the first DL sub-frame of the second frame, and the method for allocating the TTI in the second frame is equal to the method for allocating the TTI in the first frame.

Figure 16:
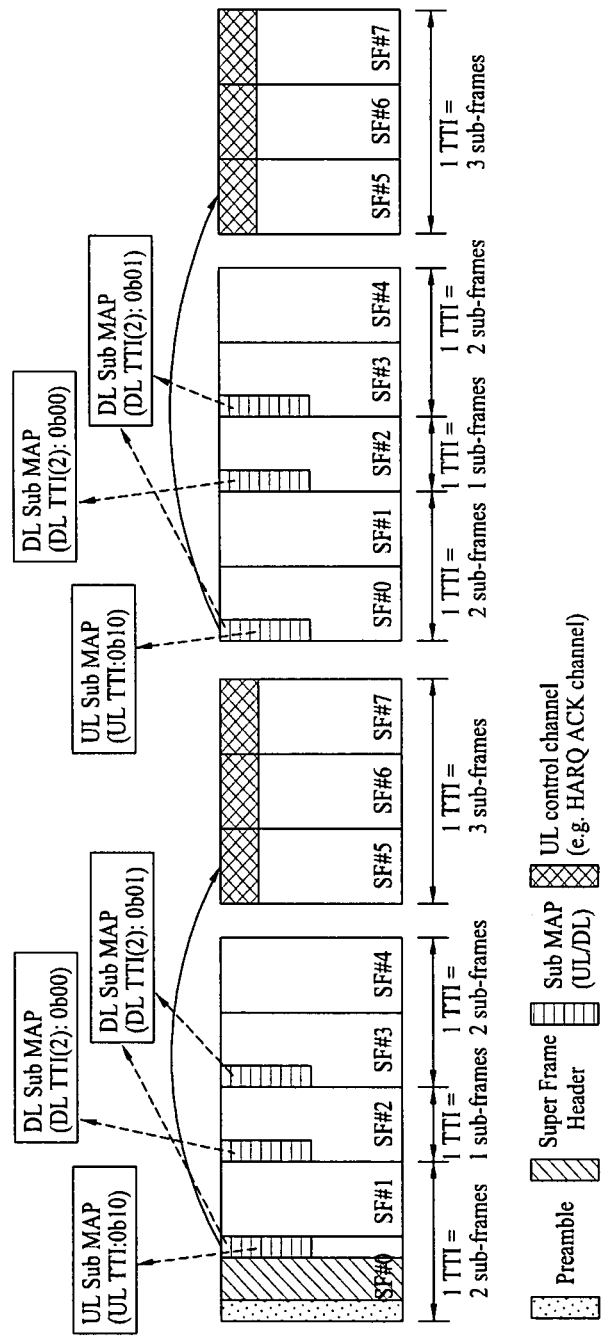
FIG. 16 is a view showing another example of a sub-frame structure in which a TTI is allocated, according to another embodiment of the present invention.

FIG. 16 is a view showing another example of a sub-frame structure in which a TTI is allocated, according to another embodiment of the present invention.

FIG. 16 shows a case where the TTI information of the DL sub-frames and the TTI information of the UL sub-frames are divided and allocated to the sub-maps, unlike FIGS. 14 and 15. That is, only the TTI information of the DL sub-frames is included in the DL sub-map and only the TTI information of the UL sub-frames is included in the UL sub-map.

Tables 4 and 5 show the DL TTI information and the UL TTI information, respectively.

TABLE 4

| Name | Size | Value |
|---|---|---|
| DL TTI | 2 bits | This indicates the length of the DL TTI of the sub-frame unit and may be included in the DL sub-map.<br>0b00: The TTI unit includes one sub-frame<br>0b01: The TTI unit includes two sub-frames.<br>0b10: The TTI unit includes three sub-frames.<br>0b11: The TTI unit includes four sub-frames |

TABLE 5

| Name | Size | Value |
|---|---|---|
| UL TTI | 2 bits | This indicates the length of the UL TTI of the sub-frame unit and may be included in the UL sub-map.<br>0b00: The TTI unit includes one sub-frame<br>0b01: The TTI unit includes two sub-frames.<br>0b10: The TTI unit includes three sub-frames.<br>0b11: The TTI unit includes four sub-frames |

Tables 4 and 5 are obtained by dividing the DL TTI information and the UL TTI information included in Table 3. Accordingly, the information indicated by the bitmap having 2 bits is equal to that of Table 3. However, the TTI information can be allocated only when the length of the TTI is changed as shown in Tables 4 and 5. That is, the size of the TTI information fixedly allocated to the sub-map may be decreased to 2 bits.

FIG. 16 will be described with reference to Tables 4 and 5.

A first sub-map includes a DL sub-map and a UL sub-map. At this time, the TTI information (DL TTI) included in a first DL sub-map is "0b01". Accordingly, it can be seen from Table 4 that two DL sub-frames (SF #0 and SF #1) configure one TTI unit. In addition, the TTI information (UL TTI) included in a first UL sub-map is "0b10". Accordingly, it can be seen from Table 5 that three UL sub-frames (SF #5, SF #6 and SF #7) configure one TTI unit.

A second sub-map included in a third sub-frame is a DL sub-map. In the second sub-map, the TTI information (DL TTI) is set to "0b00". Accordingly, it can be seen from Table 4 that one sub-frame configures one TTI unit.

A third sub-map included in a fourth sub-frame is a DL sub-map. At this time, since the TTI information (DL TTI) is set to "0b01" in the third sub-map, it can be seen from Table 4 that two sub-frames configure one TTI.

In FIG. 16, it can be seen that the configuration of the second frame is substantially equal to that of the first frame. The configuration of the second frame is different from the configuration of the first frame in that the super frame header is not included in the first sub-frame (SF #0) of the second frame. The TTI information of the second frame is substituted with the description of the first frame.

Figure 17:
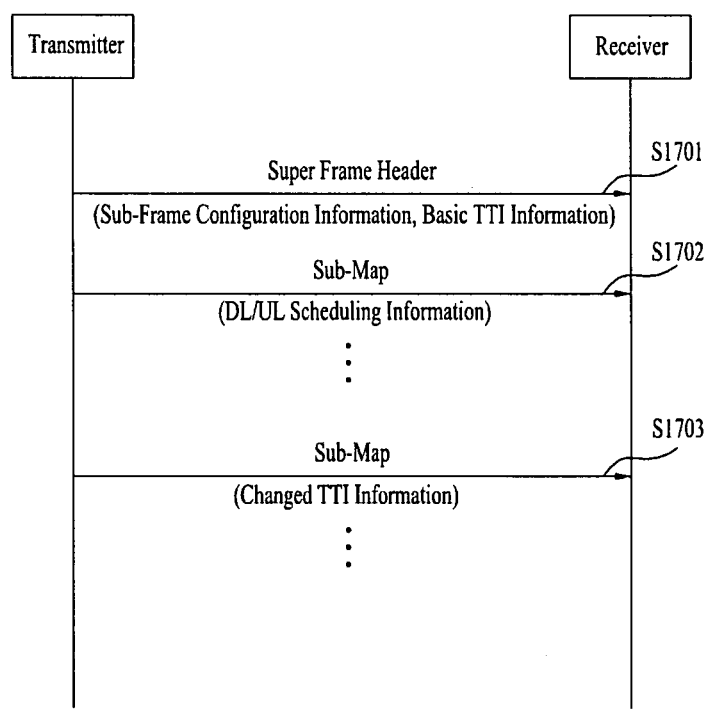
FIG. 17 is a view showing a method for allocating a basic TTI using a super map and changing a TTI using a sub-map, according to another embodiment of the present invention.

FIG. 17 is a view showing a method for allocating a basic TTI using a super frame header and changing a TTI using a sub-map, according to another embodiment of the present invention.

FIG. 17 shows a method for changing the TTI information of the sub-map in the unit of sub-maps only when the super frame header includes the basic TTI information and the TTI information needs to be changed. In this case, the sub-map including the changed TTI information only in the sub-map in which the TTI information needs to be changed is transmitted so as to reduce sub-map overhead compared with the case where the TTI information is included in all the sub-maps.

Referring to FIG. 17, a transmitter transmits a super frame header including sub-frame configuration information (e.g., DL/UL ratio) and basic TTI information to a receiver (S1701).

In the step S1701, as the basic TTI information, the TTI information described in Table 1 or Table 2 may be used and thus the description thereof will be substituted with the description of Table 1 and Table 2.

The transmitter transmits a sub-map including at least one of DL scheduling information and UL scheduling information to the receiver (S1702).

In the step S1702, the receiver may receive DL data or transmit UL data using scheduling information allocated by the transmitter.

The TTI may be changed while the transmitter and the receiver perform communication. At this time, the transmitter may transmit the sub-map including the changed TTL information to the receiver and change the TTI in a desired frame (S1703).

In the step S1703, the changed TTI is applied to only the sub-frame corresponding to the changed TTI information. If this sub-frame is passed, the basic TTI information included in the super frame header in the step S1701 is used.

Table 6 shows an example of DL TTI information (DL TTI IE) which may be used in the step S1703.

TABLE 6

| Syntax | Size (bit) | Contents |
|---|---|---|
| DL TTI IE ( ) { | — | — |
| Type | 4 | This indicates DL TTL IE<br>Value = TBD |

TABLE 6-continued

| Syntax | Size (bit) | Contents |
|---|---|---|
| Length | 2 | |
| DL TTI | 2 | This indicates the length of the DL TTI of the sub-frame unit and may be included in the DL sub-map.<br>0b00: The TTI unit includes one sub-frame<br>0b01: The TTI unit includes two sub-frames.<br>0b10: The TTI unit includes three sub-frames.<br>0b11: The TTI unit includes four sub-frames |
| } | | |

Referring to Table 6, the DL TTI information includes a type parameter indicating that a message is DL TTI information, a length parameter indicating the length of the DL TTI information, and DL TTI information indicating the TTI configuration of a DL sub-frame.

The DL TTI parameter performs the same role as the DL TTI parameter of Table 3 and Table 4 and thus the description thereof will be substituted with the description of Table 3. Accordingly, if the DL TTI is changed in FIG. 17, the transmitter may include the changed DL TTI information of Table 6 in the sub-map and transmit the sub-map to the receiver.

Table 7 shows an example of UL TTI information (UL TTI IE) which may be used in the step S1703.

TABLE 7

| Syntax | Size (bit) | Contents |
|---|---|---|
| UL TTI IE ( ) { | — | — |
| Type | 4 | This indicates UL TTL IE<br>Value = TBD |
| Length | 2 | |
| UL TTI | 2 | This indicates the length of the UL TTI of the sub-frame unit and may be included in the UL sub-map.<br>0b00: The TTI unit includes one sub-frame<br>0b01: The TTI unit includes two sub-frames.<br>0b10: The TTI unit includes three sub-frames.<br>0b11: The TTI unit includes four sub-frames |
| } | | |

Referring to Table 7, the UL TTI information includes a type parameter indicating that a message is UL TTI information, a length parameter indicating the length of the UL TTI information, and UL TTI information indicating the TTI configuration of a UL sub-frame.

The UL TTI parameter performs the same role as the UL TTI parameter of Table 3 and Table 5 and thus the description thereof will be substituted with the description of Table 3. Accordingly, if the UL TTI is changed in FIG. 17, the transmitter may include the changed UL TTI information of Table 7 in the sub-map and transmit the sub-map to the receiver.

Figure 18:
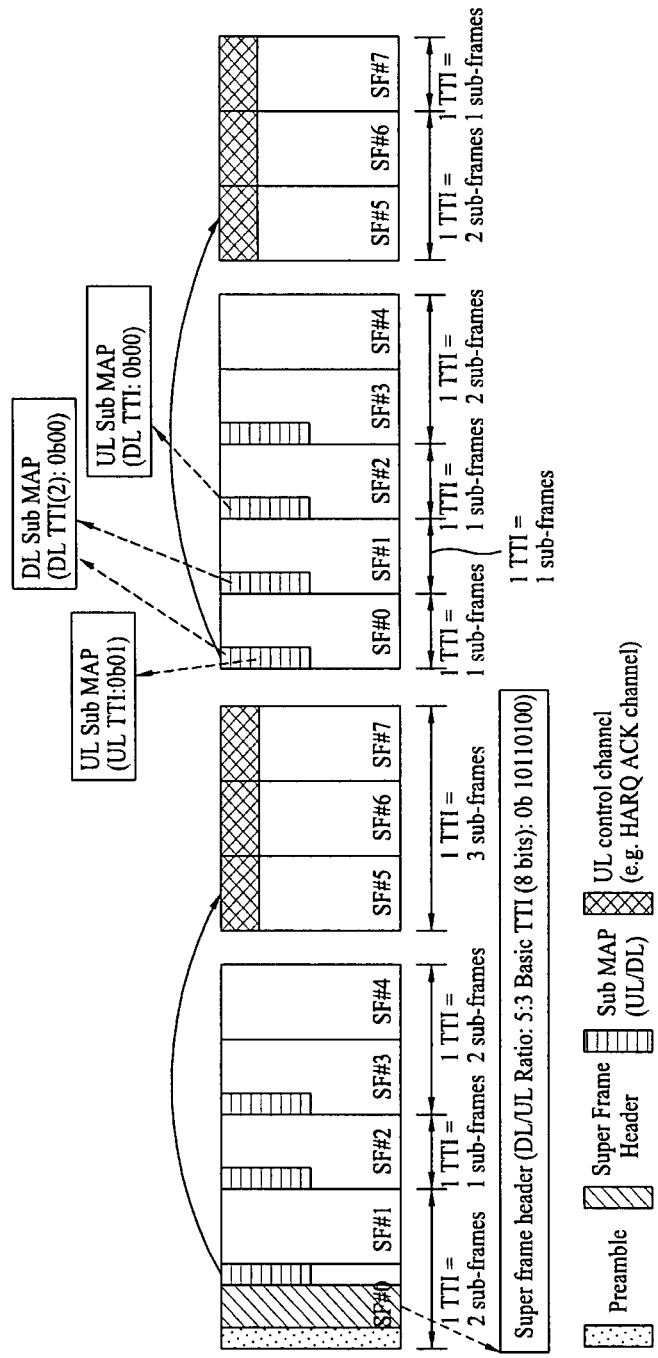
FIG. 18 is a view showing an example of a sub-frame structure in which a TTI is allocated, according to another embodiment of the present invention.

FIG. 18 is a view showing an example of a sub-frame structure in which a TTI is allocated, according to another embodiment of the present invention.

The basic TTI information included in the super frame header of FIG. 18 may use the bitmap scheme of Table 1 or Table 2. In FIG. 18, the bitmap scheme of Table 2 is used. The TTI information included in the super frame header of FIG. 18 is "0b10110/100". Accordingly, in the DL sub-frames, SF #0 and SF #1 configure one TTI, SF #2 configures one TTI, and SF #3 and SF #4 configure one TTI. In addition, in the UL sub-frames, SF #5, SF #6 and SF #7 configure one TTI.

An MS can know how the TTI information of the frame unit is set in a current super frame, by checking the basic TTI information of the super frame header. Accordingly, referring to FIG. 18, it can be seen that the DL sub-maps are located at SF #0, SF #2 and SF #3 by the TTI and the UL sub-map is located at SF #0 by the basic TTI.

In FIG. 18, it is assumed that the TTI information is changed in a second frame of the super frame. A BS transmits the sub-map including the changed TTI information to the MS, in order to deliver the changed TTI information.

Since the first DL sub-frame (SF #0) of the second frame configures one TTI, DL TTI (0b00) which is the TTI information is changed in the DL sub-map of SF #0. The changed TTI information has an influence on a next sub-frame. Accordingly, the second sub-frame (SF #1) of the second frame includes a DL sub-map for resource allocation of the second sub-frame. In addition, DL TTI information (0b00) of the second sub-frame (SF #1) may be included in the DL sub-map.

In addition, referring to FIG. 18, the TTI configuration of the UL sub-frame of the second frame is changed from three sub-frames to two sub-frames and one sub-frame. Accordingly, the BS includes the UL TTI information (0b01) in the sub-map (or the UL sub-map) of SF #0, includes UL TTI information in the sub-map (or the UL sub-map) of SF #2, and transmits the sub-maps to the MS.

Figure 19:
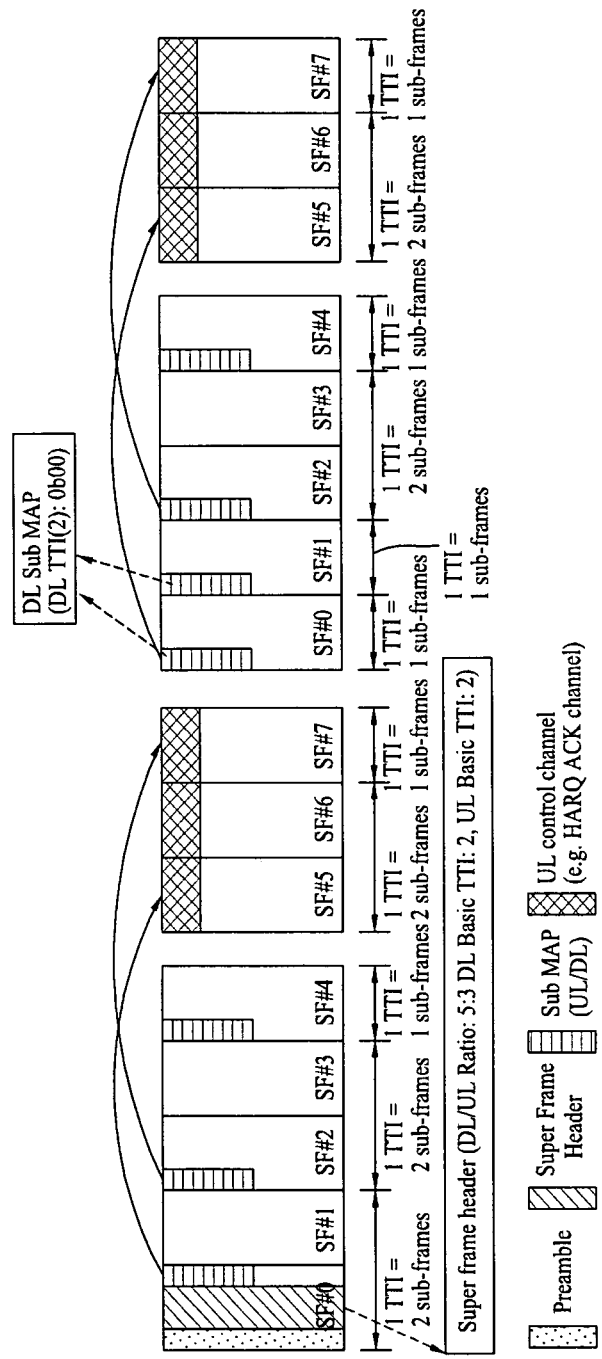
FIG. 19 is a view showing another example of a sub-frame structure in which a TTI is allocated, according to another embodiment of the present invention.

FIG. 19 is a view showing another example of a sub-frame structure in which a TTI is allocated, according to another embodiment of the present invention.

The basic TTI information included in FIG. 19 may use the bitmap scheme of Table 1 or Table 2. In FIG. 19, the bitmap scheme of Table 1 is used. At this time, it is assumed that the basic TTI information included in the super frame header is set to "0b01". Accordingly, in the DL sub-frames and the UL sub-frames, two sub-frames configure one TTI.

Accordingly, in the DL sub-frames, SF #0 and SF #1 configure one TTI, SF #2 and SF #3 configure one TTI, and one residual sub-frame SF #4 configures one TTI. In addition, in the UL sub-frames, SF #5 and SF #6 configure one TTI, and one residual sub-frame SF #7 configures one TTI. In addition, the sub-map of SF #0 includes the scheduling information of SF #5 and SF #6 which are the UL sub-frames and the sub-map of SF #2 includes the scheduling information of SF #7.

In FIG. 19, it is assumed that the TTI information is changed in a second frame of the super frame. A BS transmits the sub-map including the changed TTI information to the MS, in order to deliver the changed TTI information to the MS.

Since the first DL sub-frame (SF #0) configures one TTI in the second frame, the DL sub-map of SF #0 includes DL TTI (0b00) which is the changed TTI information. The TTI information changed in SF #0 has an influence on a second sub-frame SF #1. Accordingly, the second sub-frame of the second frame includes a DL sub-map for resource allocation of the second sub-frame #1. In addition, DL TTI information (0b00) of the second sub-frame (SF #1) may be included in the second sub-map. The MS may configure the sub-frame using the sub-map including the changed TTI information.

Figure 20:
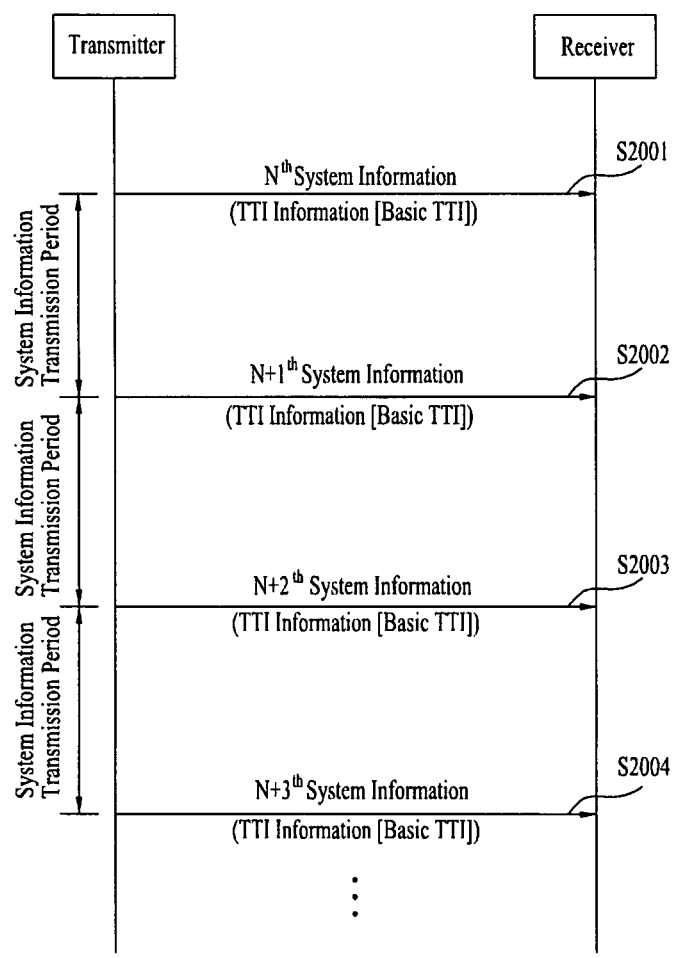
FIG. 20 is a view showing a method for transmitting TTI information using a system information delivering message according to another embodiment of the present invention.

FIG. 20 is a view showing a method for transmitting TTI information using a system information delivering message according to another embodiment of the present invention.

A transmitter may dynamically allocate the TTI to the receiver using a system information delivering message (e.g., UCD or DCD) in addition to a map message such as a super frame header or a sub-map. If the change of the TTI information does not frequently occur in the system, unnecessary resource waste may occur when the TTI information is fixedly included in the super frame header or the sub-map. That is, when the change of the TTI information does not frequently occur, the transmitter may deliver the TTI information to the receiver using the system information delivering message.

Referring to FIG. 20, the transmitter may transmit an $N^{th}$ system information delivering message including the basic TTI information to the receiver (S2001).

Table 8 shows an example of TTI information included in the system information delivering message.

TABLE 8

| Type | Length (byte) | Value |
| --- | --- | --- |
| Basic TTI | 1 | Bits #0 to #1: DL TTI<br>Bits #2 to #3: UL TTI<br>This indicates the DL or UL TTI supported by the system and the unit thereof indicates the number of sub-frames.<br>0b00: The TTI unit includes one sub-frame<br>0b01: The TTI unit includes two sub-frames.<br>0b10: The TTI unit includes three sub-frames.<br>0b11: The TTI unit includes four sub-frames<br>Default value = 0b00<br>Bit #4 to #7: reserved |

Referring to Table 8, one sub-frame configures one TTI if the basic TTI is "0b00", two sub-frames configure one TTI if the basic TTI is "0b01", three sub-frames configure one TTI if the basic TTI is "0b10", and four sub-frames configure one TTI if the basic TTI is "0b11". The basic TTI is basically set to "0b00".

The transmitter may include the TTI information of Table 8 in every period of the system information delivering message and transmit the system information delivering message to the receiver (S2002).

The receiver may receive the system information delivering message including the TTI information and configure the sub-frame using the received TTI information. If the TTI information is changed, the transmitter may transmit the system information delivering message including the changed TTI information to the receiver (S2003 and S2004).

In the step S2003 and the step S2004, the changed TTI information includes all cases in which the TTI unit set in the basic TTI information is changed. Accordingly, the changed TTI information also has the same format as the format described in Table 8.

Table 9 shows another example of the TTI information included in the system information delivering message.

TABLE 9

| Type | Length (byte) | Value |
| --- | --- | --- |
| Basic TTI | 1 | Each bit indicates the TTI information of the DL sub-frames and the UL sub-frames. |

Referring to Table 9, the basic TTI information may have 8 bits (1 byte). Each of 8 bits may be mapped to each of 8 sub-frames (that is, the DL sub-frames and the UL sub-frames). At this time, if the value of the bit is 1, it is indicated that a new TTI is started and, if the value of the bit is 0, it is indicated that a previous TTI is continued.

For example, when the ratio (DL/UL ratio) of the DL sub-frames to the UL sub-frames is 5:3, MSB 5 bits indicate information about the DL sub-frames. In addition, LSB 3 bits indicate information about the UL sub-frames. If the TTIs of all the sub-frames are set to 1, the bitmap of the basic TTI information is represented by "0b111111/111".

If the bitmap of the basic TTI information included in the super frame header is set to "0b11110/110", one sub-frame configures one TTI from the first DL sub-frame (SF #0) to third DL sub-frame (SF #2), and the fourth sub-frame (SF #3) and the fifth sub-frame (SF #4) configure one TTI (2 sub-frames). In addition, in the UL sub-frames, the first UL sub-frame (SF #5) configures one TTI, and two residual sub-frames (SF #6 and SF #7) configure one TTI.

In FIG. 20, when the transmitter transmits the system information delivering message to the receiver in every system information transmission period, the basic TTI information of Table 8 to Table 9 may be included in the system information delivering message. If the system changes the TTI information midway, the transmitter may include the changed TTI information of Table 6 or Table 7 in the sub-map (e.g., DL-Sub MAP or UL-Sub MAP) and transmit the sub-map to the MSs. That is, the operation similar to the operation of FIG. 18 or 19 may be performed.

Figure 21:
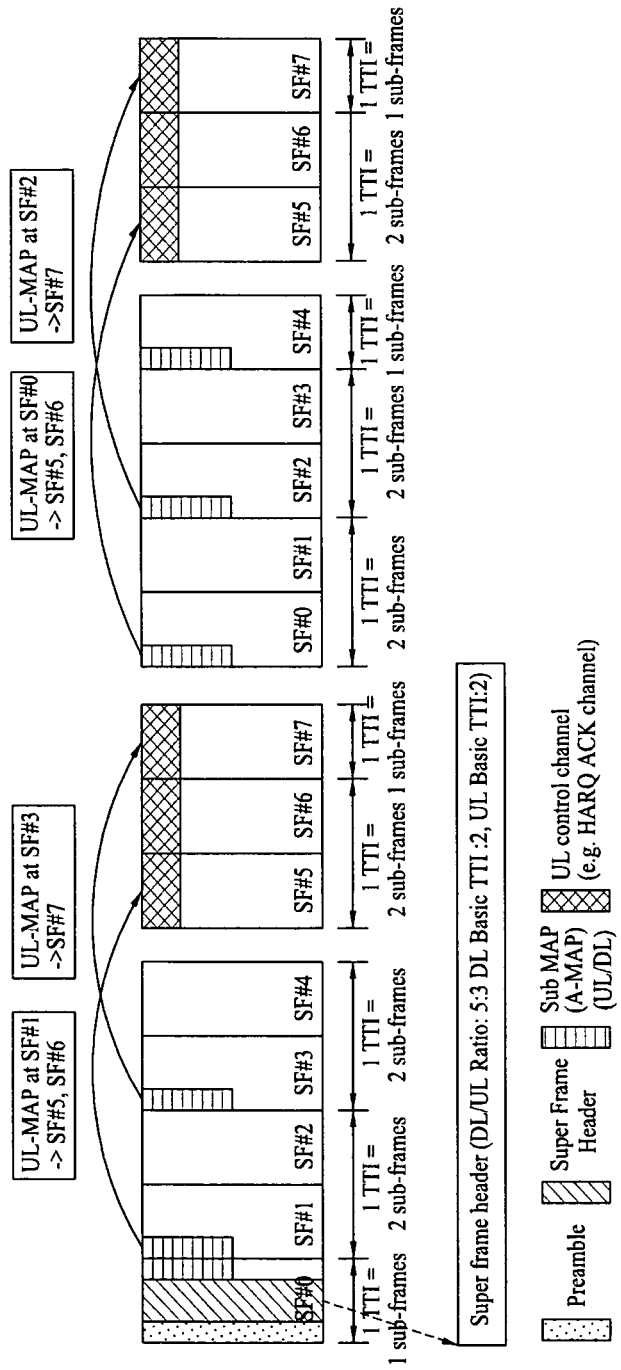
FIG. 21 is a view showing another example of a sub-frame structure in which a TTI is allocated, according to another embodiment of the present invention.

FIG. 21 is a view showing another example of a sub-frame structure in which a TTI is allocated, according to another embodiment of the present invention.

FIG. 21 shows another embodiment of FIG. 11 or another embodiment of the case where the first sub-frame of the super frame includes the sub-map (that is, information for allocating the resource of the MS). That is, although the sub-map is included in the first sub-frame included in the super frame, the TTI is computed from the second sub-frame of the first frame of the super frame.

That is, although the TTI is set to "n" (2 in the embodiment), the sub-map (resource allocation information) included in the first sub-frame of the first frame of the super frame includes only resource allocation information associated with the first sub-frame, and a time point when the TTI ("n") value is actually applied is started from the second sub-frame.

The first frame of the super frame will be described with reference to FIG. 21. In the DL sub-frames of the first frame, SF #0 (first sub-frame) configures one TTI, SF #1 and SF #2 configure one TTI, and SF #3 and SF #4 configure one TTI. In the UL sub-frames, SF #5 and SF #6 configure one TTI and SF #7 configures one TTI.

The UL TTI information of the first frame is transmitted to the MS via a super frame header. In the embodiments of the present invention, the super frame header may be called a DL control channel, a system information delivering message or a broadcast control channel (BCCH).

The TTI configuration from the second frame to the last frame of the super frame is as follows according to the super frame header. In the DL sub-frames, SF #0 and SF #1 configure one TTI, SF #2 and SF #3 configure one TTI, and SF #4 configures one TTI. In the UL sub-frames, SF #5 and SF #6 configure one TTI and SF #7 configures one TTI. In the second frame of the super frame, the scheduling information of SF #5 and SF #6 may be included in the sub-map of SF #0 and the scheduling information of SF #7 may be included in the sub-map of SF #2.

Figure 22:
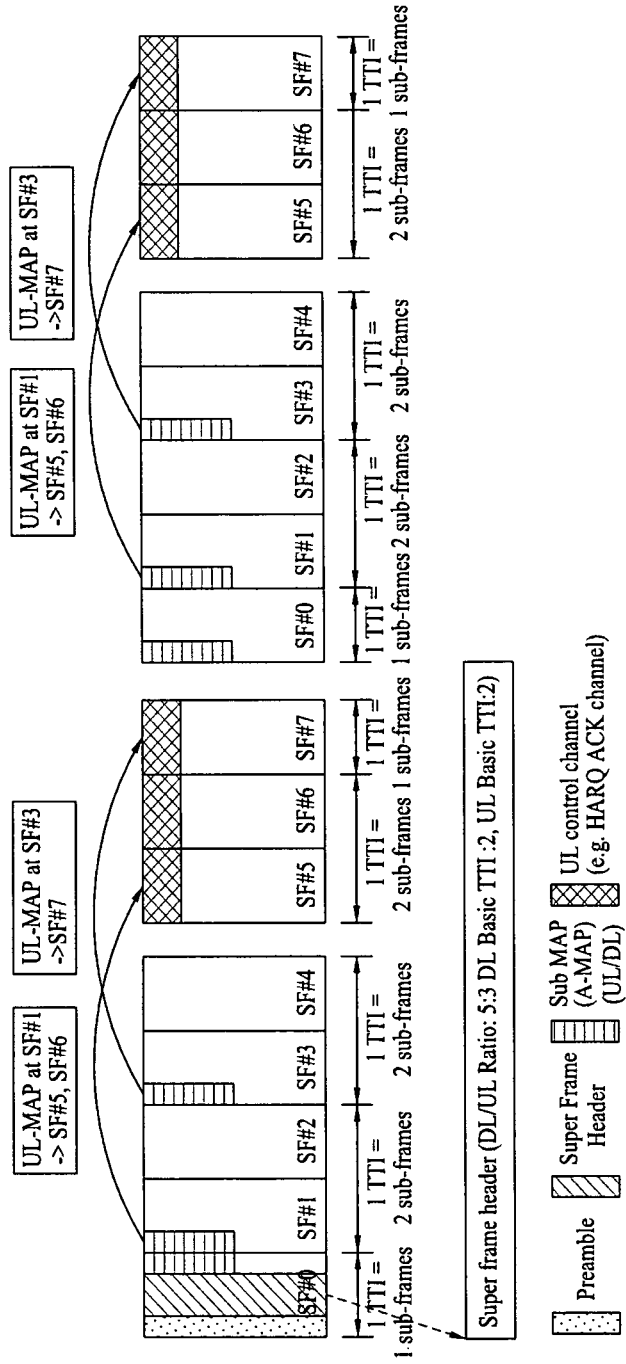
FIG. 22 is a view showing another example of a sub-frame structure in which a TTI is allocated, according to another embodiment of the present invention.

FIG. 22 is a view showing another example of a sub-frame structure in which a TTI is allocated, according to another embodiment of the present invention.

FIG. 22 shows another embodiment of FIG. 21 or another embodiment of the case where the first sub-frame of the super frame includes the sub-map (that is, information for allocating the resource of the MS). That is, although the sub-map is included in the first sub-frame included in the super frame, the TTI is computed from the second sub-frame of the first frame of the super frame. That is, although the TTI is set to "n" (2 in the embodiment), the sub-map (resource allocation information) included in the first sub-frame of the first frame of the super frame includes only resource allocation information associated with the first sub-frame, and a time point when the TTI ("n") value is actually applied is started from the second sub-frame.

The first frame of the super frame will be described with reference to FIG. 22. In the DL sub-frames of the first frame, SF #0 (first sub-frame) configures one TTI, SF #1 and SF #2 configure one TTI, and SF #3 and SF #4 configure one TTI. In the UL sub-frames, SF #5 and SF #6 configure one TTI and SF #7 configures one TTI.

The UL TTI information of the first frame is transmitted to the MS via a super frame header (which may be called a DL control channel, a system information delivering message or a BCCH).

The TTI configuration from the second frame to the last frame of the super frame is as follows according to the super frame header. The first sub-frame of every frame configures the TTI in order to match the TTI information of the first frame and the three residual frames. Accordingly, the sub-map located subsequent to the first sub-map of every frame includes only resource allocation information associated with the first sub-frame.

In the DL sub-frames, SF #0 configures one TTI, SF #1 and SF #2 configure one TTI, and SF #3 and SF #4 configure one TTI. In the UL sub-frames, SF #5 and SF #6 configures one TTI and SF #7 configures one TTI. In the second frame of the super frame, the scheduling information of SF #5 and SF #6 may be included in the sub-map of SF #1 and the scheduling information of SF #7 may be included in the sub-map of SF #3.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. In addition, embodiments may be configured by combining claims which do not have an explicit citation relationship therebetween or new claims may be added by an amendment after the application.

INDUSTRIAL APPLICABILITY

The embodiments of the present invention are applicable to various radio access systems. Examples of various radio access systems include the 3$^{rd}$ generation partnership project (3GPP), the 3GPP2, the 3GPP long term evolution (LTE), the 3GPP long term evolution-advanced (LTE-A), and/or the Institute of Electrical and Electronic Engineers 802 (IEEE 802.xx). The embodiments of the present invention are applicable to all technical fields using the various radio access systems as well as the various radio access systems.

The invention claimed is:

1. A method for transmitting dynamic transmit time interval (TTI) information by a transmitting side in a radio access system, the method comprising:
   transmitting a super frame header (SFH), including the TTI information and subframe configuration information, to a receiving side,
   wherein the TTI information comprises indicator values indicating a number of at least one subframe configured in one TTI and the number of the at least one subframe configured in the one TTI is one, two, three, or four, and
   wherein the subframe configuration information comprises information regarding a number of subframes included in a super frame and a ratio of a number of downlink subframes to a number of uplink subframes; and
   transmitting a sub-map (A-MAP) including scheduling information for a corresponding TTI to the receiving side,
   wherein the sub-map (A-MAP) includes one of the indicator values, and
   wherein the sub-map (A-MAP) is located at a beginning subframe only within the corresponding TTI when a number of subframes configured in the corresponding TTI is two, three, or four.

2. The method according to claim 1, wherein the TTI information further comprises downlink TTI information including indicator values indicating a number of at least one downlink subframe configured in one TTI and uplink TTI information including indicator values indicating a number of at least one uplink subframe configured in one TTI.

3. The method according to claim 2, wherein each of the downlink TTI information and the uplink TTI information has a size of 2 bits.

4. The method according to claim 1, wherein the SFH is periodically transmitted in every super frame.

5. The method according to claim 1, wherein the ratio of the number of downlink subframes to the number of uplink subframes is 5:3 or 4:4.

6. The method according to claim 2, further comprising transmitting downlink signals to the receiving side according to the TTI information, the subframe configuration information, and the sub-map (A-MAP).

7. The method according to claim 1, wherein:
   the super frame includes four frames, and each of the four frames includes five downlink subframes and three uplink subframes.

8. A method for receiving dynamic transmit time interval (TTI) information by a receiving side in a radio access system, the method comprising:
   receiving a super frame header (SFH), including subframe configuration information and the TTI information, from a transmitting side;
   wherein the TTI information comprises indicator values indicating a number of at least one subframe configured in one TTI and the number of the at least one subframe configured in the one TTI is one, two, three, or four, and
   wherein the subframe configuration information comprises information regarding a number of subframes included in a super frame and a ratio of a number of downlink subframes to a number of uplink subframes;
   receiving a sub-map (A-MAP) including resource allocation information for a corresponding TTI from the transmitting side,
   wherein the sub-map (A-MAP) includes one of the indicator values, and
   wherein the sub-map (A-MAP) is located at a beginning subframe only within the corresponding TTI when a number of subframes configured in the corresponding TTI is two, three, or four; and
   receiving downlink signals from the transmitting side based on the TTI information, the subframe configuration information, and the sub-map (A-MAP).

9. The method according to claim 8, wherein the resource allocation information comprises uplink control channel allocation information, the method further comprising:
   transmitting an uplink control signal to the transmitting side based on the TTI information, the subframe configuration information, and the sub-map (A-MAP).

* * * * *